UNITED STATES PATENT OFFICE.

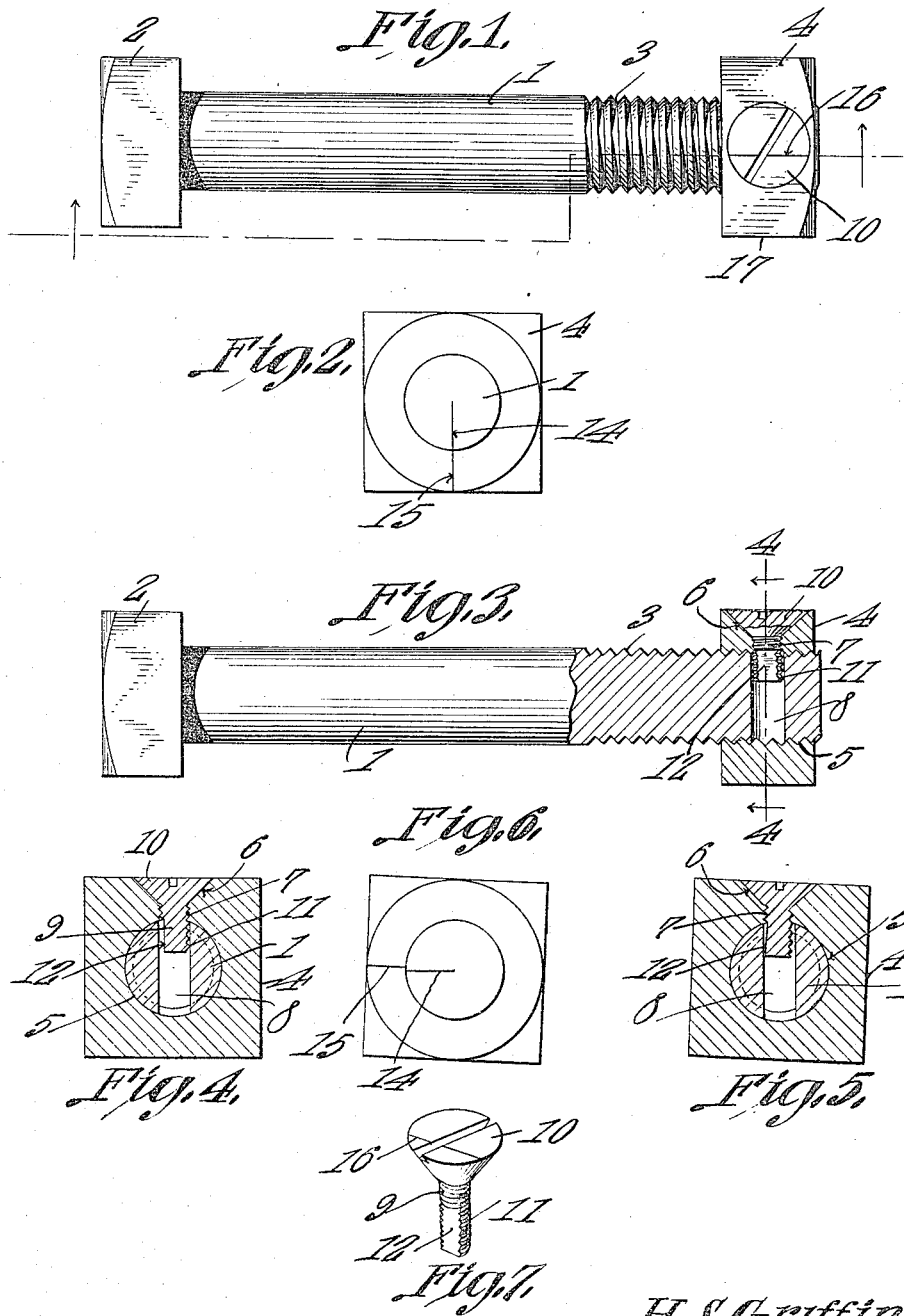

HENRY S. GRIFFIN, OF PIQUA, OHIO.

BRASS-SCREW NUT-LOCK.

1,167,690.　　　　Specification of Letters Patent.　　Patented Jan. 11, 1916.

Application filed September 20, 1915. Serial No. 51,650.

*To all whom it may concern:*

Be it known that I, HENRY S. GRIFFIN, a citizen of the United States, residing at Piqua, in the county of Miami and State of Ohio, have invented a new and useful Brass-Screw Nut-Lock, of which the following is a specification.

The device forming the subject matter of this application is a nut lock of that general type in which a screw, being threaded into the nut, engages the bolt to prevent the nut from rotating on the bolt.

The present invention aims so to construct the screw above mentioned that, when the nut is rotated slightly, the screw will be prevented from being detached from the nut, the screw then being thoroughly efficient as a means for holding the nut against further rotation on the bolt.

It is within the province of the disclosure to improve generally and to enhance the utility of devices of that type to which the present invention appertains.

With the above and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed, without departing from the spirit of the invention.

In the accompanying drawing:—Figure 1 shows in side elevation, a nut and bolt lock constructed in accordance with the present invention; Fig. 2 is an end elevation of the structure shown in Fig. 1; Fig. 3 is a side elevation, wherein sundry parts appear in section; Figs. 4 and 5 are sections on the line 4—4 of Fig. 3, the nut being in slightly different positions in the said figures; Fig. 6 is an end elevation of the structure, when the parts are arranged as shown in Fig. 5; Fig. 7 is a perspective of the nut holding screw.

In carrying out the present invention there is provided a bolt 1 which may be equipped at one end with a head 2. It is to be understood, however, that the head 2 may be dispensed with, the bolt, at this end, being constructed as found expedient or necessary. One end of the bolt 1 is threaded as shown at 3. The threaded end of the bolt may be variously constructed, and the precise showing of the drawings may be departed from without jeopardizing the utility of the invention.

The numeral 4 indicates a nut having a threaded bore 5 receiving the threaded portion 3 of the bolt 1. In one edge of the nut 4 is fashioned a counter-sunk seat 6 communicating with a threaded passage 7 adapted to be alined with a transverse opening 8 formed in the bolt 1. The opening 8 has been shown as extended entirely through the bolt, but this opening may be fashioned differently, if desired.

The invention comprises a screw 9 preferably made of brass, and embodying a head 10 and a threaded shank 11. One side of the shank 11 of the screw 9 is flattened as shown at 12. On the end of the bolt 1 there is a mark 14 and when this mark is lined up, as shown in Fig. 2, with a mark 15 on the end face of the nut 4, then the threaded passage 7 of the nut 4 is lined up with the opening or seat 8 in the bolt 1. The screw 10 is now threaded into the passage 7 of the nut 4 and enters the opening or seat 8 in the bolt 1. When the head 10 of the screw 9 is in firm abutment with the counter-sunk seat 6 in the edge of the nut 4 then a mark 16 is made on the head 10 of the screw 9, parallel to one side face 17 of the nut 4. The screw 9 is then removed and the flat face 12 is filed off, parallel to the mark 16. As a consequence of the foregoing, when the head 10 bears firmly against the seat 6 then the flattened face 12 of the screw 9 will be parallel to the axis of the bolt 1.

In practical operation, the nut 4 is threaded onto the bolt 1 and the marks 14 and 15 are lined up as shown in Fig. 2. Then the screw 9 is inserted into the nut 4, whereupon the parts appear as shown in Fig. 4. Then the nut 4 is given a slight rotation on the bolt 1 until the parts appear as shown in Figs. 6 and 5, under which circumstances, the flat side 12 of the screw 9 is engaged by the bolt 1 within the contour of the opening 8 as shown in Fig. 5. The screw 9 thus is prevented from rotating and the screw, in turn, prevents the nut 4 from rotating farther.

Having thus described the invention, what is claimed is:—

In a device of the class described, a bolt having a transverse opening; a nut threaded onto the bolt and provided with a threaded passage adapted to be alined with the opening; and a screw threaded into the passage and entering the opening in the bolt, the screw having a flat side adapted to be engaged by the bolt when the nut is rotated slightly on the bolt, thereby to prevent the screw from rotating in the nut and to render the screw efficient as a means for preventing a further rotation of the nut.

In testimony that I claim the foregoing as my own, I have hereto affixed my signature in the presence of two witnesses.

HENRY S. GRIFFIN.

Witnesses:
HAROLD DE WEISE,
E. M. BELL.

Copies of this patent may be obtained for five cents each, by addressing the "Commissioner of Patents, Washington, D. C."